US009639530B2

(12) United States Patent
Vance et al.

(10) Patent No.: US 9,639,530 B2
(45) Date of Patent: May 2, 2017

(54) COMPONENT MEASUREMENT APPARATUS, SYSTEM, AND METHOD

(71) Applicant: The Boeing Company, Chicago, IL (US)

(72) Inventors: Jonathan B. Vance, St. Louis, MO (US); Andrew J. Martignoni, III, Collinsville, IL (US); Ken Nguyen, Arnold, MO (US)

(73) Assignee: The Boeing Company, Chicago, IL (US)

( * ) Notice: Subject to any disclaimer, the term of this patent is extended or adjusted under 35 U.S.C. 154(b) by 103 days.

(21) Appl. No.: 14/485,610

(22) Filed: Sep. 12, 2014

(65) Prior Publication Data

US 2016/0078024 A1    Mar. 17, 2016

(51) Int. Cl.
| | | |
|---|---|---|
| *G06K 7/10* | (2006.01) | |
| *B64F 5/00* | (2006.01) | |
| *G06F 17/30* | (2006.01) | |
| *G06Q 10/06* | (2012.01) | |
| *B64F 5/60* | (2017.01) | |

(52) U.S. Cl.
CPC .... *G06F 17/30011* (2013.01); *G06K 7/10386* (2013.01); *G06Q 10/0633* (2013.01); *B64F 5/60* (2017.01)

(58) Field of Classification Search
CPC .......... G06K 7/10376; G06K 7/10386; G06K 7/10366; G06K 2007/1052; B64F 5/60
USPC ........................................ 235/492, 451, 385
See application file for complete search history.

(56) References Cited

U.S. PATENT DOCUMENTS

| | | | |
|---|---|---|---|
| 8,521,448 B1* | 8/2013 | Ung | B64F 5/0045 702/42 |
| 8,566,054 B1 | 10/2013 | Schweigert et al. | |
| 2002/0110263 A1 | 8/2002 | Thompson | |
| 2003/0183226 A1* | 10/2003 | Brand | A61M 15/0065 128/200.23 |
| 2005/0203389 A1* | 9/2005 | Williams | A61B 6/463 600/431 |
| 2005/0258961 A1* | 11/2005 | Kimball | G06Q 20/203 340/572.1 |
| 2007/0191787 A1* | 8/2007 | Lim | A61B 5/1405 604/246 |
| 2007/0208308 A1* | 9/2007 | Gibson | A61M 5/007 604/131 |
| 2007/0241908 A1* | 10/2007 | Coop | G06Q 10/06 340/572.8 |

(Continued)

FOREIGN PATENT DOCUMENTS

| | | |
|---|---|---|
| EP | 2757508 | 7/2014 |
| GB | 2417091 | 2/2006 |
| WO | 2004074808 | 9/2004 |

OTHER PUBLICATIONS

Extended European Search Report for EP Application No. 15173765.7 dated Jan. 18, 2016.

*Primary Examiner* — Suezu Ellis
(74) *Attorney, Agent, or Firm* — Kunzler Law Group, PC

(57) ABSTRACT

According to one embodiment, an apparatus for measuring a component supported on a fixture includes a housing, a wireless transceiver coupled to the housing, a radio frequency identification (RFID) reader coupled to the housing, and a magnet coupled to the housing. The magnet is magnetically attracted to a portion of the fixture to removably secure the housing to the fixture.

18 Claims, 6 Drawing Sheets

(56) References Cited

U.S. PATENT DOCUMENTS

| | | | | |
|---|---|---|---|---|
| 2009/0043607 | A1* | 2/2009 | Nemoto | A61B 6/00 705/2 |
| 2009/0054766 | A1* | 2/2009 | Nemoto | A61B 6/00 600/425 |
| 2010/0117823 | A1* | 5/2010 | Wholtjen | G06F 19/327 340/539.13 |
| 2010/0163573 | A1* | 7/2010 | Wegelin | B67D 1/0078 222/1 |
| 2013/0327327 | A1* | 12/2013 | Edwards | A61M 15/0028 128/203.11 |
| 2015/0090527 | A1* | 4/2015 | Salour | G06K 7/10396 182/3 |
| 2015/0181313 | A1* | 6/2015 | Murphy | H04Q 9/00 340/870.02 |
| 2016/0325058 | A1* | 11/2016 | Samson | A61M 15/0065 |

\* cited by examiner

COMPONENT MEASUREMENT APPARATUS, SYSTEM, AND METHOD

FIELD

This disclosure relates generally to the measurement of components, and more particularly to automatic collection, processing, and distribution of measurements of a component using a wireless device.

BACKGROUND

Measuring manufactured components for quality assurance purposes is well known in the art. Typically, a physical copy of a work order is received by an operator. The work order identifies the component to be measured and the measurements to be taken. Components are measured manually with a measurement device. Each manually obtained measurement is manually matched with a corresponding component identification and/or location on the component. Once all measurements of a component are taken, the measurements and matching component data are entered into an electronic database for future electronic processing and analysis. An operator may initially write down the measurements onto the physical copy of the work order before manually inputting the measurements into the electronic database.

SUMMARY

The subject matter of the present application has been developed in response to the present state of the art, and in particular, in response to the problems and needs of apparatus, systems, and methods for measuring components, particularly large components, that have not yet been fully solved by currently available techniques. For example, although conventional techniques for taking measurements of components may result in accurate measurements, the manually intensive processes associated with such techniques are prone to error. For example, an operator may incorrectly write down a measurement onto a physical copy of a work order and/or incorrectly enter the measurements into an electronic database. Also, conventional quality assurance processes delay the measurement analysis procedures until the measurement acquisition procedures are completed. Accordingly, conventional processes do not provide measurement analysis in real-time as measurements are taken. In general, the subject matter of the present application has been developed to provide an apparatus, a system, and a method that overcome at least some of the above-discussed shortcomings of the prior art.

According to one embodiment, an apparatus for measuring a component supported on a fixture includes a housing, a wireless transceiver coupled to the housing, a radio frequency identification (RFID) reader coupled to the housing, and a magnet coupled to the housing. The magnet is magnetically attracted to a portion of the fixture to removably secure the housing to the fixture.

In some implementations, the apparatus further includes a work order identification reader coupled to the housing. The work order identification reader may include a barcode scanner.

In certain implementations of the apparatus, the magnet includes a permanent magnet. In alternative implementations, the magnet includes an electromagnet that is switchable between magnetic and non-magnetic states.

According to some implementations, the apparatus includes a data port coupled to the housing. The data port is configured to receive a data communication cable from a measurement device. The RFID reader can be configured to identify the fixture.

In yet another embodiment, a system for measuring a component includes a fixture that supports the component. The fixture includes an RFID tag coupled to the fixture, where the RFID tag stores data identifying the fixture. The system also includes an apparatus with a housing, an RFID reader coupled to the housing, and an attachment element coupled to the housing. The RFID reader reads the data stored on the RFID tag and the attachment element removably couples the housing to the fixture. The attachment element can include a magnet that magnetically couples the housing to the fixture.

According to some implementations of the system, the fixture includes a reference feature. The system may further include a measurement device that engages the reference feature and the component to take measurements of the component. The measurement device communicates measurements to the apparatus. The apparatus further includes a data port coupled to the housing and the measurement device includes a data communication cable that interfaces with the data port to communicate the measurements to the apparatus. The system can further include a user-engagement feature that is engageable by a user to communicate a measurement taken by the measurement device to the apparatus.

In certain implementations of the system, the apparatus further includes a wireless transceiver and the system further includes at least one wireless router, a network coordinator in wireless communication with the wireless router, and a computer network in communication with the coordinator. The apparatus automatically transmits measurement data to and receives work order data from the computer network via the wireless transceiver, wireless router, and network coordinator.

According to some implementations of the system, the RFID reader automatically reads the data stored on the RFID tag as the housing is removably coupled to the fixture. The fixture may include indicia identifying a location on the fixture for placement of the housing, where the location includes the RFID tag.

In certain implementations of the system, the fixture is one of a plurality of fixtures that cooperatively support the component. Each fixture of the plurality of fixtures includes an RFID tag coupled to the fixture. Each RFID tag stores data identifying the fixture of the plurality of fixtures to which the respective RFID tag is coupled.

According to yet another embodiment, a method for measuring a component supported on a fixture includes removably coupling a handheld apparatus to the fixture. The method also includes electronically uploading fixture data from an RFID tag coupled to the fixture using an RFID reader of the handheld apparatus. Further, the method includes automatically uploading a measurement of the component into the handheld device, and electronically linking the uploaded measurement to the fixture data.

In some implementations, the method includes electronically uploading a work order identification using an identification reader of the handheld apparatus, and obtaining a measurement plan associated with the work order identification from a computer via a wireless communication network. The method may include automatically updating the measurement plan with the measurement of the component using a processing module of the handheld device, and automatically sending the updated measurement plan to the computer via the wireless communication network. According to certain implementations of the method, removably coupling the handheld apparatus to the fixture includes magnetically coupling the handheld apparatus to a marked location on the fixture. The marked location can correspond with a position of the RFID tag.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
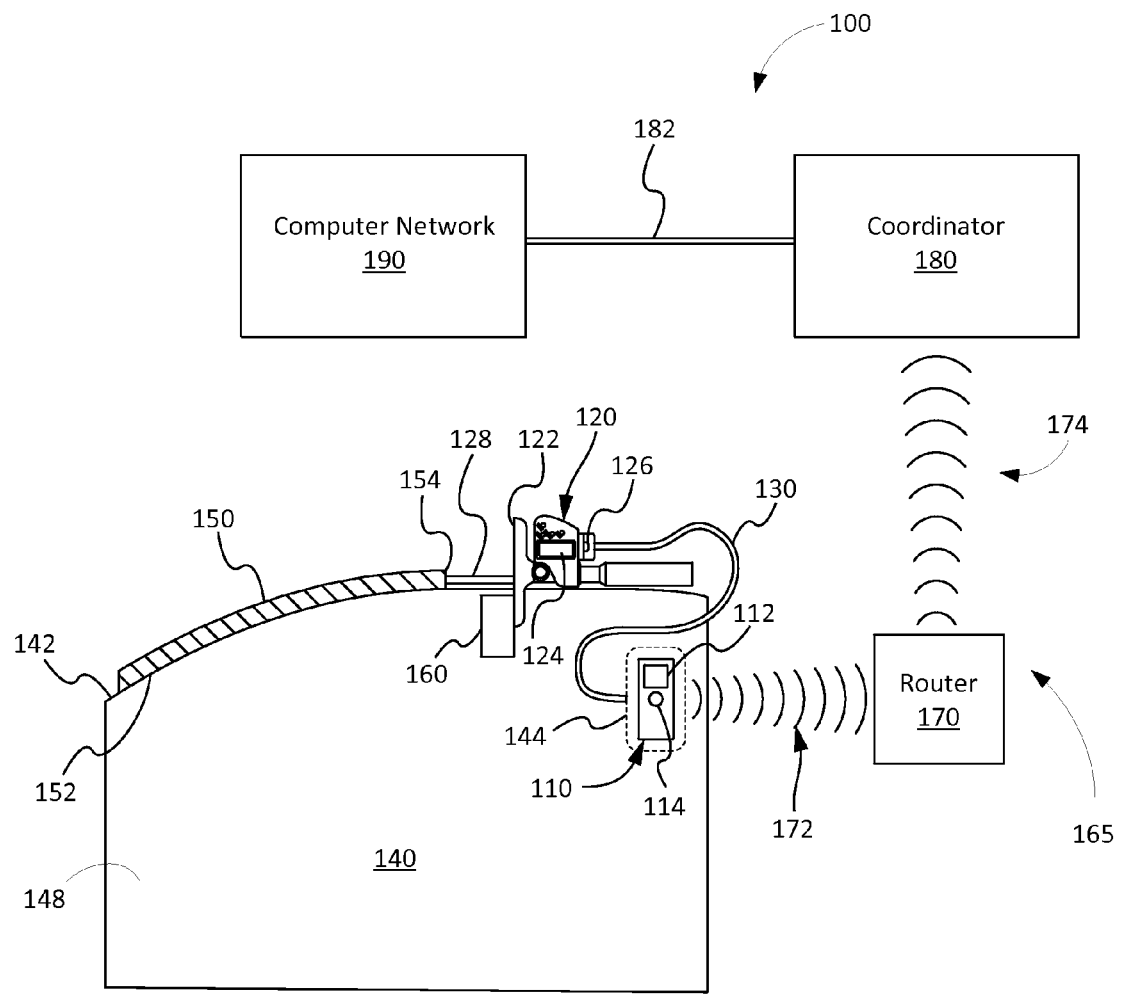
FIG. 1 is a schematic diagram of a system for measuring components according to one embodiment.

FIG. 1 illustrates one embodiment of a system 100 for measuring a component 150. The system 100 includes a handheld apparatus 110, a measurement device 120, a fixture 140, a wireless network 165, and a computer network 190. Generally, the measurement device 120 is operable to take a measurement of the component 150. The measurement taken by the measurement device 120 is uploaded to the handheld apparatus 110, which wirelessly communicates with at least one router 170 of the wireless network 165. The router 170 then communicates the measurement received from the handheld apparatus 110 to a coordinator 180 of the wireless network 165. Subsequently, the coordinator 180 communicates the measurement to the computer network 190. Although FIG. 1 shows the handheld apparatus 110 wirelessly communicating with the coordinator 180 indirectly via the router 170, in some embodiments the handheld apparatus 110 may communicate directly with the coordinator (e.g., without using a router).

The component 150 can be any of various components. In some embodiments, the component 150 is a relatively large component, such as a wing skin panel of an aircraft, which can have a major dimension of several feet up to tens, hundreds, and even thousands of feet. As an example, a large aircraft, such as a multiple-passenger airliner, includes multiple wing skin panels that cooperatively form the wing skin of the aircraft. Generally, the wings of an aircraft are contoured or bowed to enhance the lift capability of the wings. Because each wing may have multiple wing skins, in order to achieve a desired overall contour and proper operation of the wing, the wing skins should be correspondingly contoured and alignable. Therefore, ensuring each wing skin has been properly formed to comply with dimensional tolerances through post-formation measurements is desired. Other large components of aircraft, such as stiffeners and stringers, can be similarly measured for quality assurance purposes. Although the subject matter of the present disclosure will be described with particular reference to relatively large components, the principles of the present disclosure are also well suited for smaller components.

Due to the size (e.g., length) of large components, such as wing skins, proper measurement of the components necessitates the placement of the components on one or more, often multiple, fixtures 140. The fixtures 140 are sized, shaped, and spaced-apart to support components 150 in a post-assembly orientation, or the orientation the components will be in after assembly. After the components 150 are properly supported on the fixtures 140, the components are ready to be measured. Although the system 100 may include multiple spaced-apart fixtures 140 (see, e.g., FIG. 4), the schematic illustration of the system in FIG. 1 shows only a single fixture. However, it is recognized that the features of the single fixture 140 shown in FIG. 1 may apply to each fixture of a system with multiple fixtures.

The fixture 140 has a support surface 142 and a side surface 148. The support surface 142 is shaped to correspond with the shape of a supported surface 152 of the component 150 being supported by the fixture. For example, the support surface 142 can be a curved top surface of the fixture 140 that corresponds with the curvature of the supported surface 152, which can be a bottom surface, of the component. In this manner, the supported surface 152 of the component 150 lies flush against the support surface 142 of the fixture. The side surface 148 can be substantially flat and define a height of the fixture 140. The support surface 142 can extend along a width of the fixture 140. Although not shown, the fixture 140 may have a second side surface opposing the side surface 148, such that a thickness of the fixture 140 can be defined between the opposing side surfaces. In one implementation, the fixture 140 is a plate-like element with a width and height each substantially larger than a thickness of the fixture. The fixture 140 can be made from any of various materials that are sufficiently strong and durable to support the component 150. In one implementation, the fixture 140 is made from a ferromagnetic material, such as nickel, cobalt, iron or associated alloys, like steel. According to another implementation shown in FIG. 3, the fixture 140 is made predominantly from a non-ferromagnetic material, such as aluminum, but includes a magnetic element 145 or slug coupled to (e.g., forming part of) the fixture proximate the indicia 144 as described below.

The fixture 140 includes indicia 144 or markings indicating a desired location for coupling the handheld apparatus 110 to the fixture. The indicia 144 can be any of various types of indicia visible to an operator. In the illustrated embodiment, for example, the indicia 144 include dashed lines forming an outline within which the handheld apparatus 110 is positionable. According to some implementations, the size and shape of the outline corresponds with the size and shape of the handheld apparatus 110.

Figure 3:
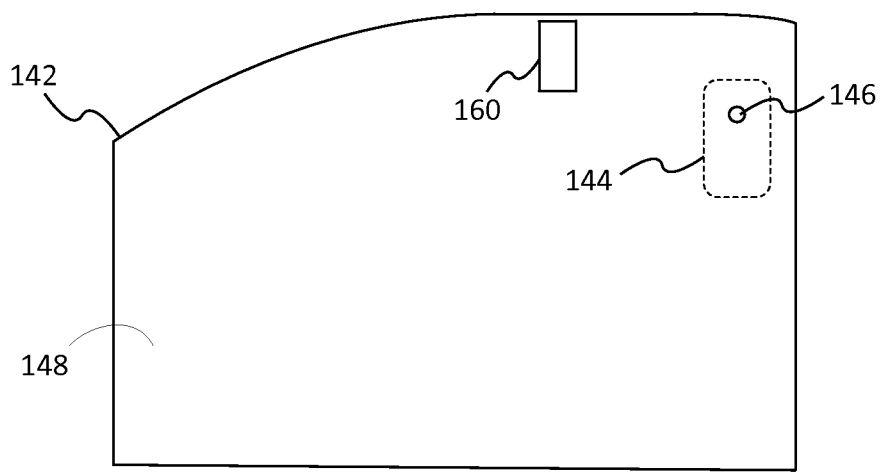
FIG. 3 is a schematic diagram of a fixture for supporting one or more components to be measured according to one embodiment.

Referring to FIG. 3, the location of the indicia 144 on the fixture 140 is associated with the location of a radio frequency identification (RFID) tag 146 on or in the fixture 140. For example, the RFID tag 146 can be located within the indicia 144 such that the indicia effectively surround the RFID tag. Generally, the RFID tag 146 acts as a transponder that emits an identifying signal in response to an interrogating signal received from an RFID reader. The RFID tag 146 includes an integrated circuit that stores data identifying the fixture 140 to which it is coupled. For example, the fixture 140 may be assigned, and identifiable to operators by, a specific name, number, symbol, or other naming convention. Accordingly, the RFID tag 146 stores data that identifies the fixture 140 by the identification assigned to the fixture. The integrated circuit of the RFID tag 146 stores data in a non-volatile memory, and may be capable of processing data using chip-wired logic or a programmed/programmable data processor. Additionally, the RFID tag 146 includes an antenna for receiving and/or transmitting data signals. The RFID tag 146 may be passive by receiving power from an external source, such as an RFID reader, or active by receiving power from an on-board battery. The RFID tag 146 can be mounted onto an external surface (e.g., the side surface 148) of the fixture 140. Alternatively, the RFID tag 146 can be embedded into the fixture 140 under an external surface (e.g., the side surface 148) of the fixture 140.

Figure 2:
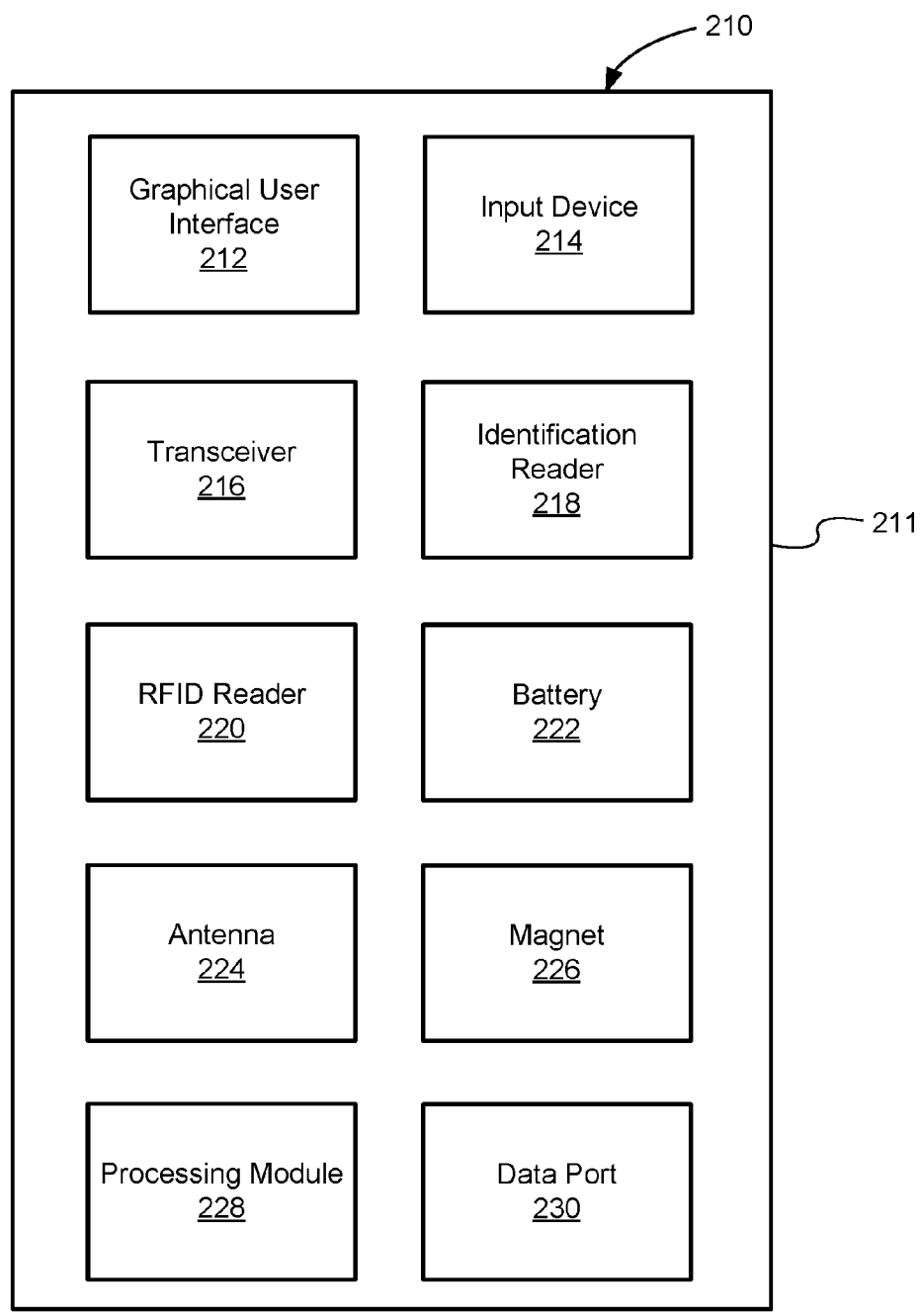
FIG. 2 is a schematic block diagram of a handheld apparatus of the system of FIG. 1 according to one embodiment.

The fixture 140 also includes a reference feature 160 that provides a reference point or plane from which to measure the component 150. The reference feature 160 can be any element capable of defining a point or plane that can be engaged by a measurement device for providing a reference from which the component 150 can be measured. In one embodiment, the reference feature 160 is a block with a flat surface against which a caliper 122 of the measurement device 120 rests while taking a measurement of the component 150. The reference feature 160 can be a separately formed feature and attached to the fixture 140 via any of various attachment techniques, such as welding, fastening, adhering, and the like. Alternatively, the reference feature 160 can be co-formed as a monolithic one-piece construction with the fixture 140. The reference feature 160 can be located on any of various surfaces of the fixture 140, such as the side surface 140 as shown in FIGS. 1 and 2. Additionally, although not necessarily, the reference feature 160 is positioned near the indicia 144 and RFID tag 146 to accommodate a wired connection between the measurement device 120 and the handheld apparatus 110 when the apparatus is coupled to the fixture in the desired location indicated by the indicia.

Figure 4:
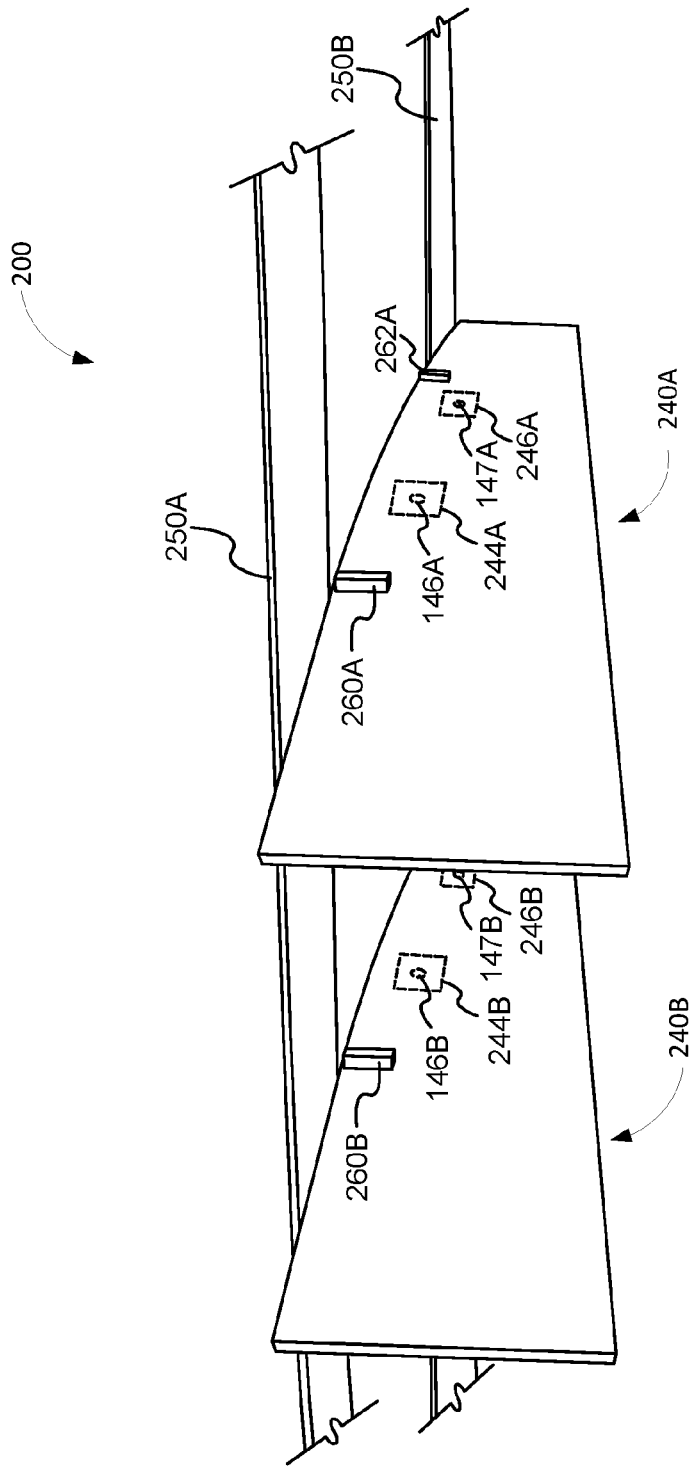
FIG. 4 is a perspective view of multiple fixtures for supporting two components to be measured according to one embodiment.

Referring to FIG. 4, a system 200 for measuring multiple components 250A, 250B is shown. The system 200 includes multiple fixtures 240A, 240B that are spaced apart from each other. Each fixture 240A, 240B is similar to the fixture 140 of FIGS. 1 and 3. For example, each fixture 240A, 240B includes a support surface. However, the support surface of each fixture 240A, 240B is long enough to support at least two components 250A, 250B as shown. Additionally, each fixture 240A, 240B includes two indicia, two RFID tags positioned proximate the indicia, and two reference features.

More specifically, the fixture 240A includes two indicia 244A, 246A, two RFID tags 146A, 147A positioned within the indicia, and two reference features 260A, 262A. The indicia 244A, RFID tag 146A, and reference feature 260A are positioned near the component 250A, when supported on the fixture 240A, and used to take measurements of the component 250A at a first location along the component 250A. The indicia 246A, RFID tag 147A, and reference feature 262A are positioned near the component 250B, when supported on the fixture 240A, and used to take measurements of the component 250B at a first location along the component 250B.

Similar to the fixture 240A, the fixture 240B includes two indicia 244B, 246B, two RFID tags 146B, 147B positioned within the indicia, and two reference features 260B (second reference feature not shown). The indicia 244B, RFID tag 146B, and reference feature 260B are positioned near the component 250A, when supported on the fixture 240B, and used to take measurements of the component 250A at a second location along the component 250A. The indicia 246B, RFID tag 147B, and second reference feature of the fixture 240B are positioned near the component 250B, when supported on the fixture 240B, and used to take measurements of the component 250B at a second location along the component 250B.

Although the system 200 is shown in FIG. 4 as having two fixtures 240A, 240B that support two components 250A, 250B, in other embodiments, the system may have more than two fixtures that support two or more components.

The measurement device 120 of the system 100 can be any of various measurement devices know in the art for measuring spatial dimensions or other characteristics of a component. In the illustrated embodiment, the measurement device 120 is a micrometer depth gauge for measuring a linear distance between an end of an actuating probe 128 of the gauge and the edge of the caliper 122 of the gauge. With the caliper 122 positioned flush against the reference feature 160, the measurement device 120 is actuated to extend the actuating probe 128 into contact with the component 150, which measures the linear distance between the reference feature and an edge 154 of the component 150 in contact with the end of the actuating probe 128. The measurement device 120 may have a visual display 124 that provides a visual indication of a measurement taken by the device and/or other information. The visual display 124 is a digital display in some implementations. The measurement device 120 may also include a user-engagement feature 126, such as a button, and a data communication cable 130. The user-engagement feature 126 is engageable by a user to push measurement data, in the form of data communication signals, from the measurement device 120 to the data communication cable 130. The data communication cable 130 interfaces with the handheld apparatus 110 to communicate measurement data received from the measurement device 120 to the handheld apparatus. Accordingly, the user-engagement feature 126 is engaged to communicate measurement data from the measurement device 120 to the handheld apparatus 110. Alternatively, the handheld apparatus 110 and the measurement device 120 may not communicate with each other over a data communication cable. In such alternative implementations, an operator may manually input measurement readings from the measurement device into the handheld apparatus 110.

Generally, the handheld apparatus 110 includes features for receiving, processing, transmitting, and displaying information and data. Referring to FIG. 1, the handheld apparatus 110 includes a housing 111 with a display 112 and a user input device 114. The display 112 provides a visual indication of information, such as measurement plans, measurements, instructions, wireless system status, battery status, fixture information, and the like. The user input device 114 facilitates the receipt of input from an operator. In one implementation, as an example, the user input device 114 is a toggle wand or directional pad that allows a user to toggle through and select information displayed on the display 112. In another implementation, the user input device 114 is a touchscreen. The display 112 and user input device 114 may be combined into an integrated display and user input device, such as a touchscreen. The housing 111 is sized and shaped to facilitate manual handling of the apparatus 110, such as with the use of a single hand. However, it is recognized, that the handheld apparatus 110 may actually be sized and shaped for use only by two hands if desirable while still following the principles of the present disclosure.

Referring to FIG. 2, according to one embodiment, a handheld apparatus 210 includes a housing 211 and one or more features coupled to (e.g., positioned within) the housing. The housing 211 can be made from any of various materials, such as hardened plastic, metal, composites, and the like, that are sufficiently strong and rigid to provide a secure foundation and protection for features coupled to the housing. The features coupled to the housing 211 can include one or more of the features shown in FIG. 2.

The handheld apparatus 210 includes a graphical user interface 212 or display, and an input device 214. The graphical user interface 212 can be similar to the display 112 of the handheld apparatus 110, and the input device 214 can be similar to the user input device 114 of the handheld apparatus 110. Similarly, the graphical user interface 212 and input device 214 can be combined into a single device, such as a touchscreen, for displaying information to and receiving input from an operator.

Additionally, the handheld apparatus 210 includes a transceiver 216 that receives and transmits wireless communication signals. The transceiver 216 can include common circuitry for providing the receiver and transmitter functionality, or the transceiver can include separate circuitry each providing the receiver and transmitter functionality, respectively. In cooperation with the transceiver 216, the handheld apparatus 210 includes an antenna 224 that physically receives and transmits the wireless communication signals. The antenna 224 can be any of various types of antennae, such as dipole antennae, whip antennae, printed circuit board (PCB) antennae, and the like. The transceiver 216 can use the antenna 224 to receive and transmit wireless communication signals of various types, standards, or protocols at various frequencies. As an example, in one implementation, the transceiver 216 receives and transmits radio waves according to the IEEE 802.15.4 standard at 2.4 GHz. Moreover, the transceiver 216 may use only those channels available on the IEEE 802.15.4 spectrum that do not overlap with potentially conflicting Wi-Fi channels in use by other communication systems. The wireless communication signals received and transmitted by the transceiver 216 may be encrypted according to standard encryption protocols. As an example, in one implementation, the wireless communication signals are encrypted according to standard 128-bit encryption.

The handheld apparatus 210 also includes an identification reader 218 that electronically reads a visual identification, such as an image, to obtain information concerning the visual identification. Generally, the identification reader 218 includes a light source and light sensor that translates optical impulses into electrical impulses. Further, the identification reader 218 may include decoder circuitry that decodes electrical impulses from the light sensor into image data representing the content of the visual identification. As an example, in one implementation, the identification reader 218 is a barcode scanner and the visual identification is a barcode. The barcode may identify a particular work order to be completed by an operator. Although not shown, the identification reader 218 can include a user-engagement feature (e.g., button) that is engageable by an operator to activate the identification reader to read a visual identification.

Further, the handheld apparatus 210 includes an RFID reader 220 that wirelessly uploads data stored on the RFID tag 146 via electromagnetic data transfer techniques. The RFID reader 220 includes a transmitter that generates an interrogating signal in the form of a short-range electromagnetic field. In operation, the RFID reader 220 is positioned such that the RFID tag 146 is exposed to the electromagnetic field generated by the RFID reader. In response to receiving the interrogating signal, the RFID tag 146 emits an electromagnetic signal identifying the content stored on the RFID tag. The RFID reader 220 includes a receiver that receives the electromagnetic signal emitted by the RFID tag 146. The receiver of the RFID reader 220 also decodes the electromagnetic signal to obtain the content stored on the RFID tag 146. Although not shown, the RFID reader 220 can include a user-engagement feature (e.g., hard or soft buttons) that is engageable by an operator, or portion of the fixture when the handheld apparatus 210 is coupled to the fixture, to activate the RFID reader to generate the interrogating signal and read an RFID tag 146. For example, the pressing of a button on the handheld apparatus 210 can be sensed by a microcontroller onboard the apparatus that triggers the RFID reader programmatically. Alternatively, the RFID reader 220 may be operable to continuously generate the interrogating signal and receive corresponding identifying signals emitted from an RFID tag 146.

The handheld apparatus 210 includes a battery 222 that provides electrical power for the various features and modules of the handheld apparatus. The battery 222 can be one or more rechargeable batteries, such as a lithium-ion battery, or one or more disposable batteries. Alternatively, in some implementations, the battery 222 is replaced or supplemented, by an external source, such as an AC power source via a power transmission cable.

Additionally, the handheld apparatus 210 includes a magnet 226 coupled to the housing 211. The magnet 226 can be any of various magnets configured to magnetically couple the housing 211 to the fixture 140, such as a magnetic element 145 of the fixture. In other words, the magnetic force of the magnet 226 is sufficiently strong to retain the housing 211 on the fixture 140 while the magnet is magnetically coupled to the fixture. Also, the magnetic force of the magnet 226 is sufficiently weak, or the magnet can be deactivated, to allow an operator to remove the housing 211 from the fixture 140 without unreasonable effort. In one implementation, the magnet 226 can be exposed to the fixture 140 such that the magnet magnetically attaches directly to the fixture in direct contact with the fixture. Alternatively, the magnet 226 may be at least partially embedded or enclosed within the housing 211 such that the magnet magnetically attaches indirectly to the fixture 140 through the housing with the housing being in direct contact with the fixture. The magnet 226 can be a permanent magnet, or an electromagnet that is switchable, such as via a user-engagement feature on the housing 211, between magnetic and non-magnetic states. Additionally, in some implementations, the magnetic element 145 and magnet 226 are configured such that magnetic engagement between them positionally reorients the handheld apparatus 210 relative to the fixture 140 into a proper orientation for reading a corresponding RFID tag.

The magnet 226 is one of a plurality of possible attachment elements coupled to the housing 211 for removably coupling the housing to the fixture 140. In other implementations, the attachment element of the handheld apparatus 210 may be an attachment element other than a magnet. As an example, the handheld apparatus 210 may have a non-magnetic attachment element, such as a loop, tab, clip, button, and the like, that removably engages a corresponding non-magnetic attachment element coupled to the fixture 140 to removably couple the housing 211 to the fixture. Although the handheld apparatus of the present disclosure is shown coupled to a side surface of the fixture, the handheld apparatus can be coupled to any surface of the fixture to which the apparatus can be secured, such as any surface other than the portion of the support surface supporting the component.

The handheld apparatus 210 further includes a processing module 228 configured to process input data and generate output data. Generally, the processing module 228 controls the operation of the various features of the handheld apparatus 210. The processing module 228 may be a single module or multiple separate modules that contain a processor or microcontroller, and computer readable storage media, such as a hard disk drive, an optical drive, non-volatile memory, random access memory ("RAM"), or the like.

Finally, the handheld apparatus 210 includes a data port 230 for interfacing with the data communication cable 130 of the measurement device 120. The data port 230 is coupled to the housing 211 and is accessible from a location external to the housing. The data port 230 can be any of various types of data ports, such as serial data ports, USB data ports, VGA data ports, SCSI data ports, and the like. Alternatively, the measurement device 120 and handheld apparatus 210 can communicate measurements wirelessly using the wireless network 165, or other wireless network, such as a Bluetooth® connection.

Referring back to FIG. 1, as mentioned above, the system 100 includes at least one router 170, at least one coordinator 180, and a computer network 190. The handheld apparatus 110, router 170, and coordinator 180 define the wireless network 165. Generally, the wireless network 165 defines a wireless local area network (LAN) conducive to facilitating wireless communication between devices within a limited geographical area or space. In one implementation, the wireless network 165 is implemented within and covers only a single structure, such as a factory. The router 170 and coordinator 180 can be any of various routers and coordinators known in the art. As an example, the router 170 can be a radio frequency (RF) router positioned on a wall, floor, or ceiling of the single structure. Additionally, although only a single router 170 is shown, the system 100 may have a plurality of routers that wirelessly communicate with each other. The coordinator 180 provides a gateway between the wireless network 165, which can be a wireless LAN, and the computer network 190. The computer network 190 can be an Ethernet/Wi-Fi wide area network (WAN), such as an Internet Protocol (IP) network, with Enterprise data systems. Additionally, the computer network 190 may include a process control module and a quality assurance module (see, e.g., FIG. 5) as will be explained in more detail below.

The computer network 190 may include one or more main frame computers, desktop computers, laptop computers, cloud servers, smart phones, tablet computers, and/or the like. Additionally, the one or more computers of the computer network 190 may include computer readable storage media, such as hard disk drives, optical drives, non-volatile memory, random access memory ("RAM"), or the like. In some embodiments, the computers of the computer network 190 can be configured to store data in one or more data storage areas associated with the computer readable storage media, such as data repositories, databases, data partitions, and/or the like. The computers of the computer network 190 may include operating systems, such as various versions of mobile and desktop operating systems provided by Microsoft®, Apple®, Linux, Android, and/or the like.

The handheld apparatus 110 and the router 170 may wirelessly communicate with each other using wireless communication signals 172. Similarly, the router 170 and coordinator 180 may wirelessly communicate with each other using wireless communication signals 174. The wireless communication signals 172, 174 can be any of various types, standards, or protocols of wireless communication signals. According to one implementation, as an example, the wireless communication signals 172, 174 are radio waves using IEEE 802.15.4 standards and ZigBee® networking protocols. The coordinator 180 communicates data to and receives data from the computer network 190 via a communication line 182, which can be a wireless or wired communication line.

Figure 5:
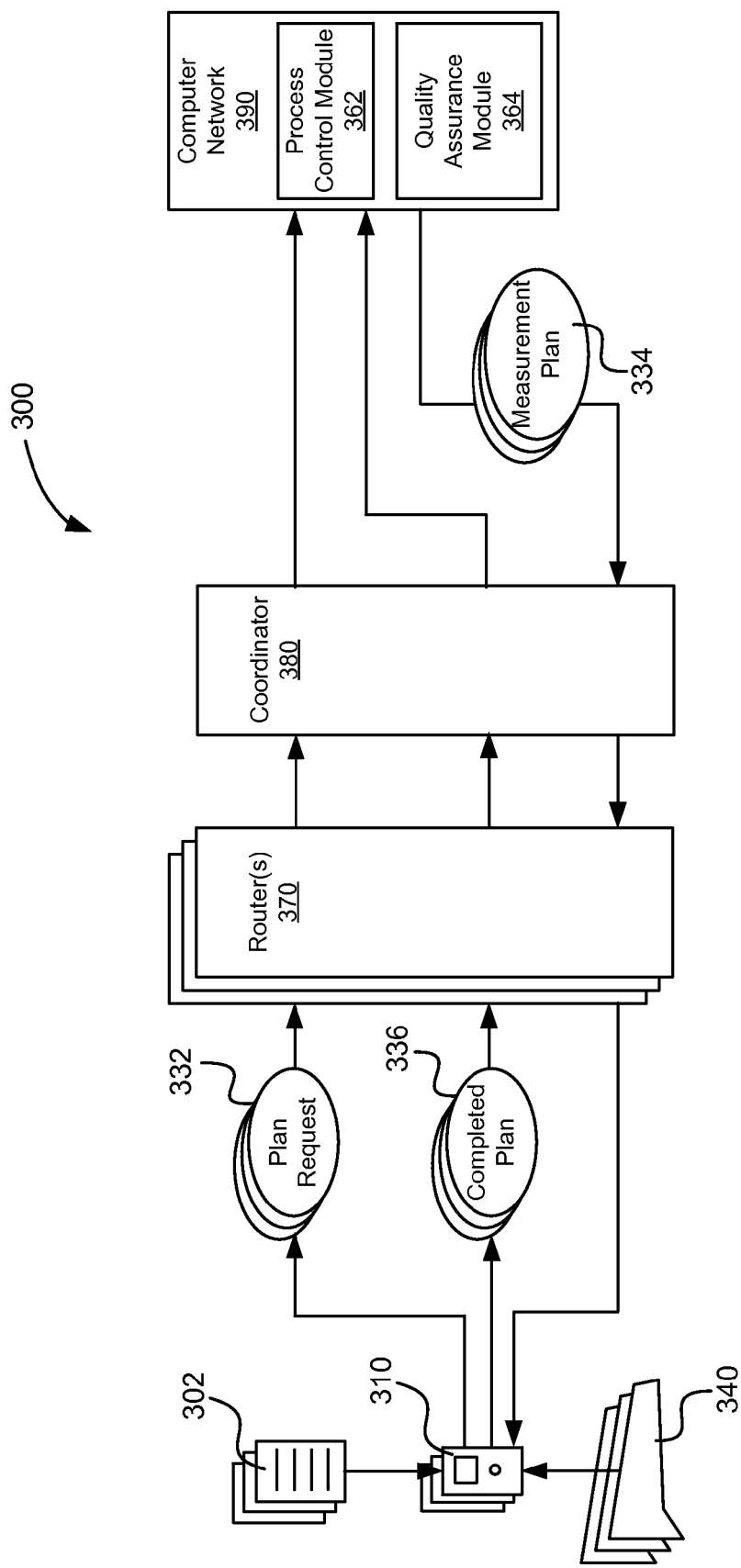
FIG. 5 is a schematic flow diagram illustrating a system for measuring components according to another embodiment.

Referring to FIG. 5, another embodiment of a system 300 for measuring one or more components 340 is shown. The system 300 includes features analogous to the features of the system 100, with like numbers referring to like elements. Accordingly, unless otherwise noted, the description of the features of the system 100 may apply equally to the respective analogous features of the system 300.

The system 300 includes one or more handheld apparatus 310. Each apparatus 310 has the same features as the handheld apparatus 210 of FIG. 2 in some implementations, and only some of the features of the handheld apparatus 210 in other implementations. An identification reader of the handheld apparatus 210 is used to read a work order identification from one work order 302 of potentially a plurality of work orders. Each work order can by a physical or electronic medium that identifies, such as via a barcode, an identification specific to the specific work order being read. The handheld apparatus 210 then generates a plan request 332 associated with a specific work order read by the handheld apparatus 310. The handheld apparatus 310 communicates the plan request 332 to a computer network 390, which can be a WAN, via one or more routers 370 and a coordinator 380, which can form part of a wireless LAN. A process control module 362 of the computer network 390 receives the plan request 332 and generates or retrieves a measurement plan 334 associated with the plan request. The computer network 390 then communicates the measurement plan 334 to the handheld apparatus 310 that generated the plan request 332 via the coordinator 380 and one or more routers 370.

The measurement plan 334 includes information regarding the measurement of a specific component 340. The information may include a work order number or identification associated with the measurement of the specific component 340, an identification of the specific component, the measurements of the component to be obtained, and an identification of the fixtures corresponding with the measurements to be obtained. Because the measurement plan 334 only provides an indication of the measurements of the component 340 to be taken, before any actual measurements are taken, the measurement plan 334 can be considered an incomplete or unfinished measurement plan. The measurement plan 334 may include instructions or guidance for completing the measurement plan 334.

The handheld apparatus 310 receives and processes the measurement plan 334, and displays information for completing the measurement plan on a display or graphical user interface of the handheld apparatus. Generally, the handheld apparatus 310 displays measurements needed for completing the measurement plan and, in some implementations, displays a field for inputting and showing completed measurements. As an example, in addition to displaying the work order number and component number, the handheld apparatus 310 displays an identification of each fixture 140 supporting the component. Also, the handheld apparatus 310 can display either blank fields corresponding with (e.g., positioned next to) the fixture identifications for which measurements have not yet been taken, or fields populated with measurements corresponding with fixture identifications for which measurements have already been taken. In some implementations, the fixture identifications and corresponding fields are presented on the display in a logical order, such as a desired order for taking the measurements, or an order corresponding with the physical order or layout of the fixtures. The display of the handheld apparatus 310 may also show the progress of completion of a measurement plan 334 via a progress bar or some other graphic.

After the handheld apparatus 310 receives the measurement plan 334, an operator removably couples the handheld apparatus to a fixture at a location on the fixture identified by indicia, such as the indicia 144. The RFID reader of the handheld apparatus 310 automatically reads the RFID tag coupled to the fixture as the handheld apparatus is removably coupled to the fixture in this manner. Based on the fixture information identified in the RFID tag content obtained from the RFID tag, the handheld apparatus 310 is prepared to receive a measurement of the component at the identified fixture. With the handheld apparatus 310 removably coupled to the fixture, the operator is able to use two hands to measure the component with a measurement device. When the measurement is obtained by the measurement device, the operator uploads the measurement to the handheld apparatus manually, such as by pressing a button in some implementations. The handheld apparatus 310 associates (e.g., links) the uploaded measurement with the fixture identified in the RFID tag content, and in certain implementations, updates the display by populating the field corresponding to the fixture identification with the measurement. If additional measurements at different fixtures are needed, the operator can remove the handheld apparatus 310 from the fixture, and removably attach it to other fixtures for taking and uploading additional measurements in the same manner as indicated above.

When the handheld apparatus 310 has received all measurements required by the measurement plan 334, the handheld apparatus generates a completed plan 336. The completed plan 336 contains data representing the measurements taken at each of the required fixtures. The handheld apparatus 310 wirelessly communicates the completed plan 336 to one or more of the routers 370, which wirelessly communicate the completed plan to the coordinator 380. The coordinator 380 communicates the completed plan 336 to the computer network 390. The process control module 362 of the computer network 390 processes the completed plan 336 and extracts measurement data from the completed plan. The measurement data can be used by a quality assurance module 364 to assess the compliance or quality of the component. In some embodiments, the computer network 390 communicates the compliance or quality of the component to the handheld apparatus 310 via the coordinator 380 and router(s) 370. The handheld apparatus 310 may then display information regarding the compliance or quality of the component as assessed by the quality assurance module 364.

Although the system 300 is shown with a handheld apparatus 310 that communicates a completed plan 336 to the computer network 390, in some embodiments, the handheld apparatus may separately communicate each measurement in real-time to the computer network. In this manner, the process control module 362 and quality assurance module 364 may continually and respectively process each measurement and assess compliance of the component on a real-time, per measurement, basis.

For some applications, multiple parts may result in multiple work orders 302 for multiple components performed by multiple operators each using one of multiple handheld apparatus 310. Each of the handheld apparatus 310 separately communicates plan requests 332 and completed plans 336 to, and receive measurement plans 334 from, the computer network 390.

Figure 6:
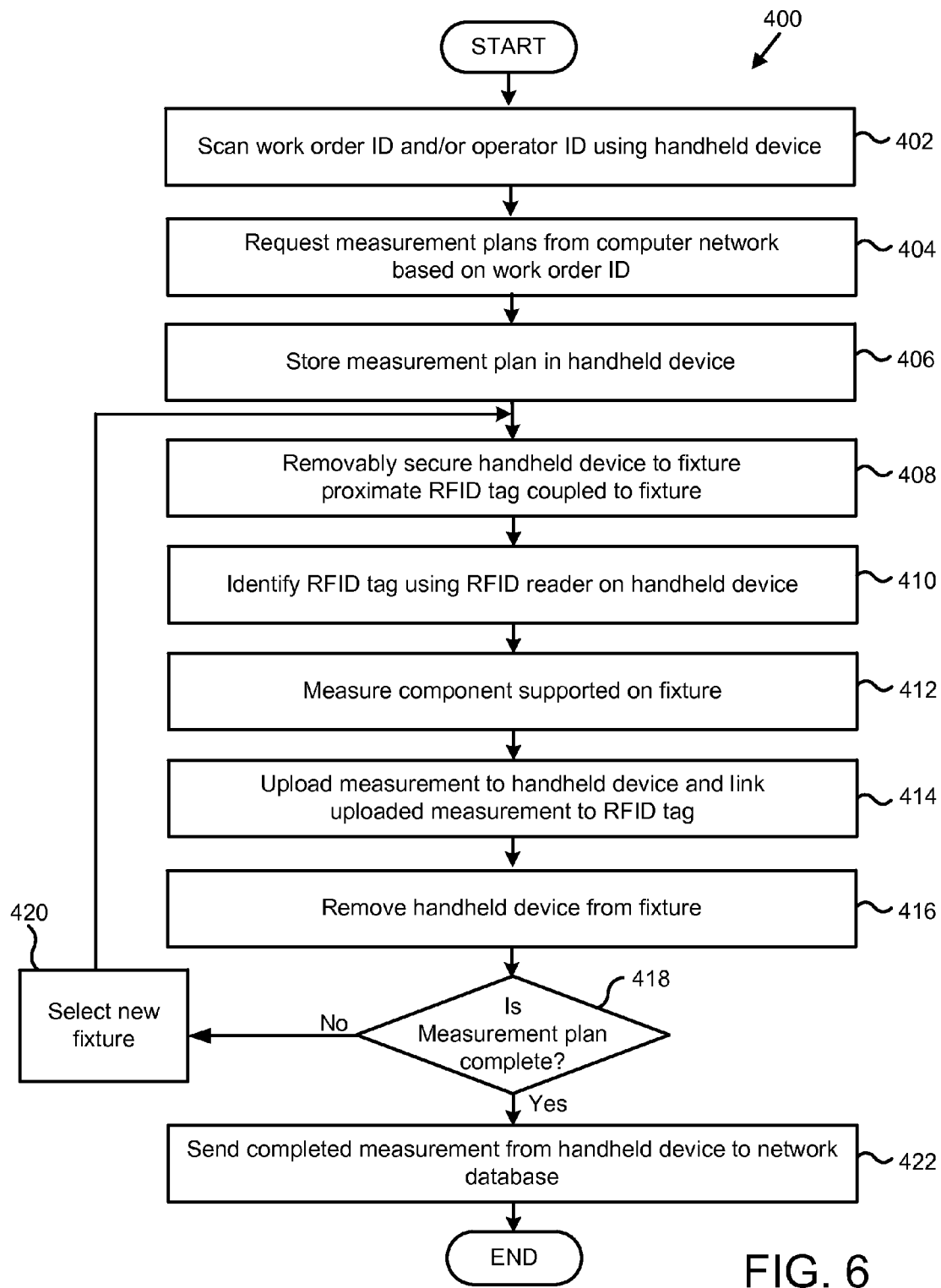
FIG. 6 is a schematic flow diagram illustrating one embodiment of method for measuring a component supported on a fixture.

Referring to FIG. 6, and according to one embodiment, a method 400 for measuring a component supported on a fixture includes scanning a work order identification (ID) and/or an operator ID using a handheld device at 402. The handheld device can be a handheld apparatus as described herein and shown in the accompanying drawings. The operator ID may be any of various images identifying the operator performing the measurements of the component. In some implementations, scanning the operator ID identifies the operator corresponding with the operator ID as the operator performing the measurements. The method 400 includes using the handheld device to request a measurement plan from a computer network based on the work order ID at 404. The measurement plan can be received by the handheld device from the computer network, and stored in the handheld device at 406.

The method 400 includes removably securing the handheld device to a fixture proximate an RFID tag coupled to the fixture at 408. The RFID tag, and its associated data content, is identified using an RFID reader on the handheld device at 410. In some implementations, the RFID reader automatically identifies the RFID tag as the handheld device is removably secured to the fixture proximate (e.g., in range of) the RFID tag. The component supported on the fixture is measured at 412. The component can be measured with any of various measurement devices, such as digital or electronic gauges. The measurement of the component measured at 412 is uploaded to the handheld device and the uploaded measurement is linked to the RFID tag (e.g., the fixture identified by the data contents of the RFID tag) by the handheld device at 414. The handheld device is then removed from the fixture at 416.

After at least one measurement is uploaded and linked to an RFID tag at 414, the method 400 determines whether a measurement plan is complete at 418. If the measurement plan is complete at 418 (e.g., all the measurements requested by the measurement plan have been uploaded and linked to respective RFID tags), then the method 400 includes sending the completed measurement plan from the handheld device to the computer network at 422, and the method ends. However, if the measurement plan is not complete at 418 (e.g., more measurements are necessary to complete the measurement plan), then the method 400 selects a new fixture at 420 and repeats actions 408, 410, 412, 414, 416 as applied to the new fixture. Of course, in some implementations, even if the measurement plan is not complete at 418, each measurement taken may be individually sent from the handheld device to the computer network until all measurements of the measurement plan have been taken and sent to the computer network.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables, and/or non-executables, of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing.

In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present disclosure may be written in any combination of one or more programming languages, including, but not limited to, an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In one implementation, the computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions, etc.

Aspects of the embodiments may be described above with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A system for measuring a solid component, comprising:
 a fixture that supports the solid component, the fixture comprising a radio frequency identification (RFID) tag coupled to the fixture, the RFID tag storing data identifying the fixture;
 an apparatus, configured to receive a measurement of the solid component, the apparatus comprising:
  a housing;
  a wireless transceiver coupled to the housing;
  an RFID reader coupled to the housing;

a magnet coupled to the housing, the magnet being magnetically attracted to a portion of the fixture to removably secure the housing to the fixture; and a work order identification reader coupled to the housing.

2. The system of claim 1, wherein the work order identification reader comprises a barcode scanner.

3. The system of claim 1, wherein the magnet comprises a permanent magnet.

4. The system of claim 1, wherein the magnet comprises an electromagnet that is switchable between magnetic and non-magnetic states.

5. The system of claim 1, wherein the apparatus further comprises a data port coupled to the housing, the data port configured to receive a data communication cable from a measurement device.

6. The system of claim 1, wherein the RFID reader identifies the fixture.

7. A system for measuring a component, comprising:

a fixture that supports the component, the fixture comprising a radio frequency identification (RFID) tag coupled to the fixture, the RFID tag storing data identifying the fixture, the fixture comprising a reference feature;

an apparatus comprising a housing, an RFID reader coupled to the housing, and an attachment element coupled to the housing, wherein the RFID reader reads the data stored on the RFID tag and wherein the attachment element removably couples the housing to the fixture; and a measurement device that engages both the reference feature of the fixture and the component to take measurements of the component and communicates the measurements to the apparatus.

8. The system of claim 7, wherein the attachment element comprises a magnet that magnetically couples the housing to the fixture.

9. The system of claim 7, wherein the apparatus further comprises a data port coupled to the housing and the measurement device comprises a data communication cable that interfaces with the data port to communicate the measurements to the apparatus.

10. The system of claim 9, further comprising a user-engagement feature that is engageable by a user to communicate a measurement taken by the measurement device to the apparatus.

11. The system of claim 7, wherein the apparatus further comprises a wireless transceiver and the system further comprises at least one wireless router, a network coordinator in wireless communication with the wireless router, and a computer network in communication with the coordinator, and wherein the apparatus automatically transmits measurement data to and receives work order data from the computer network via the wireless transceiver, wireless router, and network coordinator.

12. The system of claim 7, wherein the RFID reader automatically reads the data stored on the RFID tag as the housing is removably coupled to the fixture.

13. The system of claim 7, wherein the fixture comprises indicia identifying a location on the fixture for placement of the housing, the location including the RFID tag.

14. The system of claim 7, wherein the fixture is one of a plurality of fixtures that cooperatively support the component, each fixture of the plurality of fixtures comprising an RFID tag coupled to the fixture, wherein each RFID tag stores data identifying the fixture of the plurality of fixtures to which the respective RFID tag is coupled.

15. A method for measuring a spatial dimension of a component supported on a fixture, comprising:

removably coupling a handheld apparatus to the fixture;

electronically uploading fixture data from a radio frequency identification (RFID) tag coupled to the fixture using an RFID reader of the handheld apparatus, wherein the fixture data comprises data identifying the fixture;

automatically uploading a measurement of the spatial dimension of the component into the handheld apparatus; and electronically linking the measurement of the spatial dimension of the component to the fixture data.

16. The method of claim 15, further comprising electronically uploading a work order identification using an identification reader of the handheld apparatus, and obtaining a measurement plan associated with the work order identification from a computer via a wireless communication network.

17. The method of claim 16, further comprising automatically updating the measurement plan with the measurement of the spatial dimension of the component using a processing module of the handheld apparatus, and automatically sending the updated measurement plan to the computer via the wireless communication network.

18. The method of claim 15, wherein removably coupling the handheld apparatus to the fixture comprises magnetically coupling the handheld apparatus to a marked location on the fixture, the marked location corresponding with a position of the RFID tag.

* * * * *